United States Patent [19]
Sengupta

[11] Patent Number: 5,661,393
[45] Date of Patent: Aug. 26, 1997

[54] CIRCUIT AND METHOD FOR DETECTING AND INDICATING THE STATE OF CHARGE OF A CELL OR BATTERY

[75] Inventor: Upal Sengupta, Oregon, Wis.

[73] Assignee: Rayovac Corporation, Madison, Wis.

[21] Appl. No.: 415,852

[22] Filed: Apr. 3, 1995

[51] Int. Cl.$^6$ .................................................. H01M 10/46
[52] U.S. Cl. ........................................ 320/5; 320/31; 320/49
[58] Field of Search .................................. 320/5, 21, 30, 320/31, 35, 39, 48, 49, 51; 324/427, 433; 340/635, 636; 429/90

[56] References Cited

U.S. PATENT DOCUMENTS

| | | | |
|---|---|---|---|
| 3,944,904 | 3/1976 | Hase | 320/23 |
| 4,016,473 | 4/1977 | Newman | 320/14 |
| 4,237,411 | 12/1980 | Kothe et al. | 320/21 |
| 4,554,500 | 11/1985 | Sokira | 320/31 |
| 4,679,000 | 7/1987 | Clark | 324/428 |
| 4,912,392 | 3/1990 | Faulkner | 320/44 |
| 4,977,364 | 12/1990 | Kardesch et al. | 320/21 |
| 5,248,928 | 9/1993 | Gilmore | 320/37 |
| 5,376,875 | 12/1994 | Yee et al. | 320/31 |

OTHER PUBLICATIONS

Gates Energy Products, "Sealed Rechargeable Batteries", 61–90; 161–188. (no date).
Toshiba, "Ni–MH Rechargeable Batteries —Technical Handbook," Japan 1–29, (1992).
"Battery Charging & Control Methods," Megihad et al., Wisconsin (1994).
"The New Power, Sengupta, Madison, Wisconsin, Rayovac Corp." (1994).

*Primary Examiner*—Edward Tso
*Attorney, Agent, or Firm*—Foley & Lardner

[57] ABSTRACT

A circuit and method for detecting and indicating the state of charge of an electrochemical cell or battery are disclosed. The invention finds particular application in the field of battery chargers for alkaline manganese dioxide cells, but may also be used in other types of chargers and electrochemical cells or batteries. In one preferred feature of the invention, a circuit low-pass filters or time-averages a charge enable control or transistor base drive signal, and provides the filtered or averaged signal as a first input to a comparator. The second input to the comparator is a predetermined reference voltage. When the voltage of the low-pass filtered or time-averaged signal becomes less than the reference voltage, the output of the comparator changes state. The change in state indicates that the cell has attained a full state of charge. Microprocessor means for accomplishing the same state of charge detection function are also disclosed.

97 Claims, 13 Drawing Sheets

Filtered Charge Enable Control Signal

LED Current

CIRCUIT AND METHOD FOR DETECTING AND INDICATING THE STATE OF CHARGE OF A CELL OR BATTERY

FIELD OF THE INVENTION

This invention relates generally to battery or electrochemical cell charge status detectors and indicators, and corresponding methods, and more particularly to circuits and methods for detecting and indicating the state of charge of individual or multiple electrochemical cells or batteries.

BACKGROUND OF THE INVENTION

Battery chargers for nickel cadmium batteries have been used for many years. In past they were generally characterized in having relatively simple circuits for terminating the provision of charging current to a battery. In one such common circuit, as soon as a battery's voltage equaled or exceeded the voltage provided by a full wave bridge rectifier, the provision of charging current to the battery was terminated.

More sophisticated variants of this basic circuit were developed for nickel cadmium, and more recently nickel metal hydride, batteries. Numerous prior art disclosures have been made suggesting methods of charging, and determining the state of charge of, nickel cadmium and nickel metal hydride batteries, including:

| Country | Pat. No. | Inventor/Applicant | Issue Date |
| --- | --- | --- | --- |
| U.S.A. | 3,944,904 | Hase | 1975 |
| U.S.A. | 4,016,473 | Newman | 1977 |
| U.S.A. | 4,237,411 | Kothe et al. | 1980 |
| U.S.A. | 4,554,500 | Sokira | 1985 |
| U.S.A. | 4,679,000 | Clark | 1987 |
| U.S.A. | 4,912,392 | Faulkner | 1990 |
| U.S.A. | 5,248,928 | Gilmore | 1993 |

In some prior art circuits, the state of charge of a battery was determined by monitoring changes in battery voltage or temperature, or by measuring the average value of charge current provided to the battery. Yet other prior art circuits terminated battery charging when a certain predetermined amount of time had passed, or when a certain number of current pulses provided to the charging battery had been missed over a predetermined period of time.

Many prior art battery charging circuits provided constant current to the nickel cadmium or nickel metal hydride batteries being charged, and monitored battery voltage continuously to determine when to terminate charge. Nickel cadmium and nickel metal hydride batteries have relatively low internal impedances, usually on the order of about 50 milliohms. Thus, open-circuit voltages (OCVs) and closed circuit voltages (CCVs) measured in those types of batteries do not differ significantly. As such a nickel-cadmium or nickel metal hydride battery nears the end of the charge cycle, voltage typically rises, levels off, and finally decreases. This decrease in battery voltage during the charge cycle is often used to terminate the charge cycle.

Other prior art battery charging circuits provided constant current to the nickel cadmium or nickel metal hydride batteries being charged, and continuously monitored battery temperature to determine when to terminate charge. As nickel cadmium and nickel metal hydride batteries near the end of their charge cycle, battery temperature suddenly increases. This increase in battery temperature was often used to terminate the charge cycle.

Still other prior art charging circuits continuously measured the average amount of charging current provided to a battery, and terminated charging when the average amount of current fell below a certain minimum threshold value.

Most prior art circuits for charging or determining the state of charge of nickel cadmium or nickel metal hydride batteries were relatively inexpensive and easy to design owing to the ease with which relevant battery parameters (such as cell temperature or closed circuit voltage) could be measured.

Descriptions of prior art battery charging methods and corresponding circuits developed for nickel cadmium and nickel metal hydride cells are set forth in Sections 3.2 and 4.2 of the Gates Energy Products Application Manual (Preliminary) entitled "Sealed Rechargeable Batteries," the handbook entitled "Ni-MH Rechargeable Batteries" published in 1992 by Toshiba Battery Co., Ltd. in Japan, and in course materials written by Dr. El-Sayed Megahed et al., and published in 1994 by the College of Engineering at the University of Wisconsin-Madison entitled "Battery Charging and Control Methods."

None of the circuits or methods described in the foregoing references, however, found ready application to the problem of charging, and indicating the state of charge of, rechargeable alkaline manganese dioxide batteries. The behavior of rechargeable alkaline manganese dioxide cells differs significantly from that observed in rechargeable nickel cadmium or nickel metal hydride batteries. See, for example, the discussion in the OEM designer's guide entitled "The New Power—RENEWAL®Reusable Alkaline™Batteries," published by Rayovac Corporation in 1994, the disclosure of which is hereby incorporated by reference in its entirety.

Rechargeable alkaline batteries have an internal impedance as high as 5 ohms, which is much higher than the internal impedance characteristic of nickel cadmium or nickel metal hydride batteries. The relatively high internal impedance of rechargeable alkaline batteries presented significant problems respecting the accurate measurement of battery voltage. As a result, the open-circuit voltage (OCV) of rechargeable alkaline batteries was typically measured between charging pulses for an accurate indication of the battery's state of charge. See, for example, U.S. Pat. No. 4,977,364 to Kordesch et al., the disclosure of which is hereby incorporated by reference in its entirety, wherein the technique of "IR-free" charging of rechargeable alkaline manganese dioxide cells is described. In nickel cadmium and nickel metal hydride, conversely, state of charge may be determined accurately using a closed circuit voltage (CCV) measurement obtained during charging.

In rechargeable alkaline batteries, battery voltage was discovered to increase rapidly during the start of the charge cycle, but to reach a plateau and remain essentially constant for the remainder of the charge cycle. The constant voltage portion of the charge cycle was found to correspond to a state of charge anywhere between about 50% and about 100% of full capacity. Thus, in a rechargeable alkaline cell, the state of charge of the cell could not be determined accurately by merely measuring its CCV or OCV. One of ordinary skill in the art will therefore appreciate readily that rechargeable alkaline batteries cannot be charged safely and reliably in prior art battery chargers designed for nickel cadmium or nickel metal hydride batteries.

One means of solving some of the unique problems presented by rechargeable alkaline batteries is described in U.S. Pat. No. 5,376,875, where Yee et al. employ logic circuitry to count charge and clock pulses. A state of full charge of a cell is indicated by measuring the time between current pulses, and determining that a full state of charge has been attained in the cell when the measured time exceeds a threshold value.

SUMMARY OF THE INVENTION

The charge status detector of the invention has certain objects. That is, the invention provides solutions to problems existing in the prior art. For example, the invention provides a circuit for detecting the state of charge of a rechargeable cell that: (a) is safe and reliable; (b) is relatively inexpensive; (c) has few electronic components; (d) is easy to implement, and (e) does not directly measure the temperature, the CCV, the OCV, or the level of current provided to a cell.

In its most basic embodiment, the charge status detector of the invention monitors a charge signal, determines a time-averaged value corresponding to the time-averaged charge signal, and detects whether the state of charge of the cell is above a predetermined level by comparing the time-averaged value to a predetermined reference value. The charge signal can be a charge enable control signal, a transistor base drive signal, or a signal from a current transformer.

The charge status detector of the invention has two preferred features: (a) a low-pass filter in combination with a comparator, and (b) a microprocessor, digital signal processor, or other software programmable device.

In the first preferred feature of the invention, a charge enable control or a transistor base drive signal is applied to a charge status detector circuit comprising a low-pass filter network and a comparator. A capacitor in the low-pass filter network charges up or discharges through a resistor, depending on whether the open-circuit voltage of the cell being charged is greater or less than the voltage of the capacitor. The low-pass filter produces an output signal which is provided as a first input to a comparator. The comparator receives a reference voltage signal as a second input. According to the relative amplitudes of the first and second inputs, the comparator produces an output signal corresponding to the state of charge of a rechargeable cell. The output signal of the comparator turns a visual indicator, or a circuit for driving a visual indicator, ON or OFF.

In the second preferred feature of the invention, a charge enable control or a transistor base drive signal is applied to a charge status detector circuit comprising a microprocessor, digital signal processor, or other software programmable device. The microprocessor determines a time-averaged value corresponding to the time-averaged charge enable control or transistor base drive signal, and compares it to a predetermined reference value. According to the sign and magnitude of the difference between the time-averaged value and the predetermined reference value, the microprocessor produces an output signal corresponding to the state of charge of a rechargeable cell. The output signal of the microprocessor turns a visual indicator, or a circuit for driving a visual indicator, ON or OFF.

The invention possesses certain advantages, including its simplicity, the low cost of the components required to make it, and the small number of modifications required to known charging circuits to implement it. Other objects, features, and advantages of the invention will become apparent from the detailed description of the invention.

BRIEF DESCRIPTION OF THE DRAWINGS

The accompanying drawings describe details of the invention, where.

DETAILED DESCRIPTION OF THE INVENTION

Throughout the drawings, like numbers refer to like parts. The terms "cell," "electrochemical cell," and "battery" are used interchangeably herein, and may refer to a dry cell, an electrochemical cell, a battery, or a plurality of electrochemical cells, dry cells, or batteries.

Figure 1:
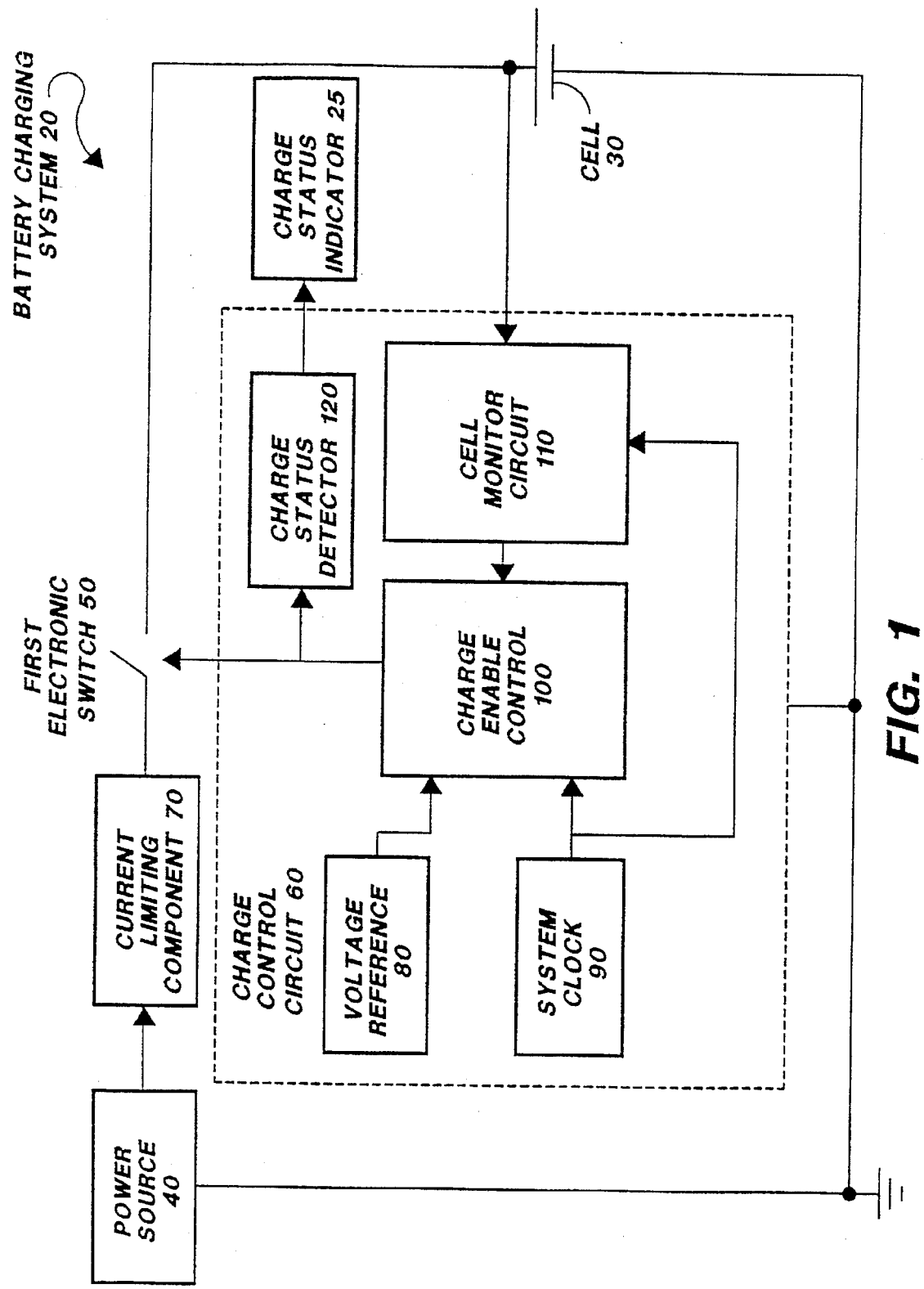
FIG. 1 shows an illustrative block diagram of a battery charging system having a charge status detector.

FIG. 1 shows a block diagram of a battery charging system 20 including a charge status detector 120. The block diagram of FIG. 1 illustrates a pulse-modulated, voltage-controlled battery charging system of a type used for charging rechargeable alkaline manganese dioxide cells.

Figure 2:
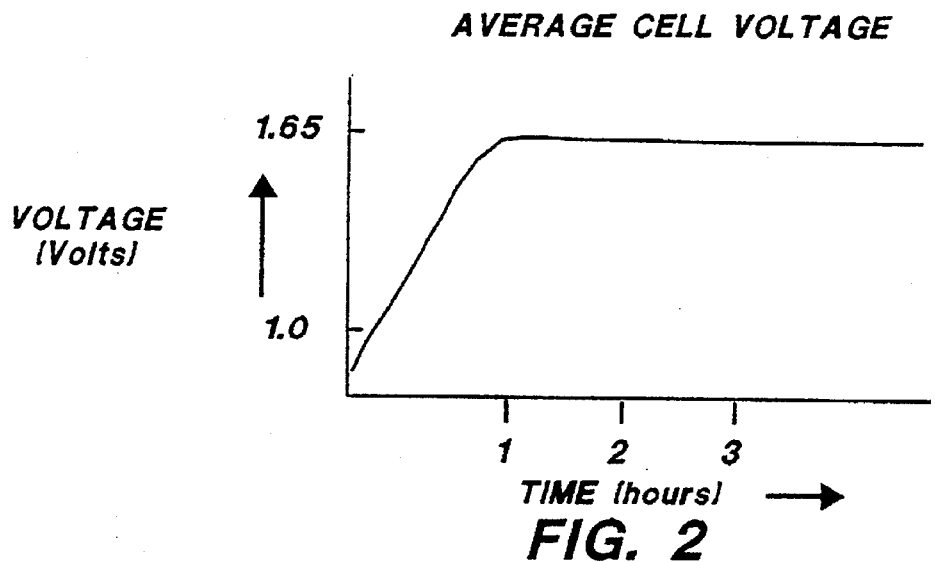
FIG. 2 shows the average voltage of a typical rechargeable alkaline manganese dioxide cell over a complete charge cycle, where the cell is charged in a circuit of the type shown in FIG. 1.
Figure 3:
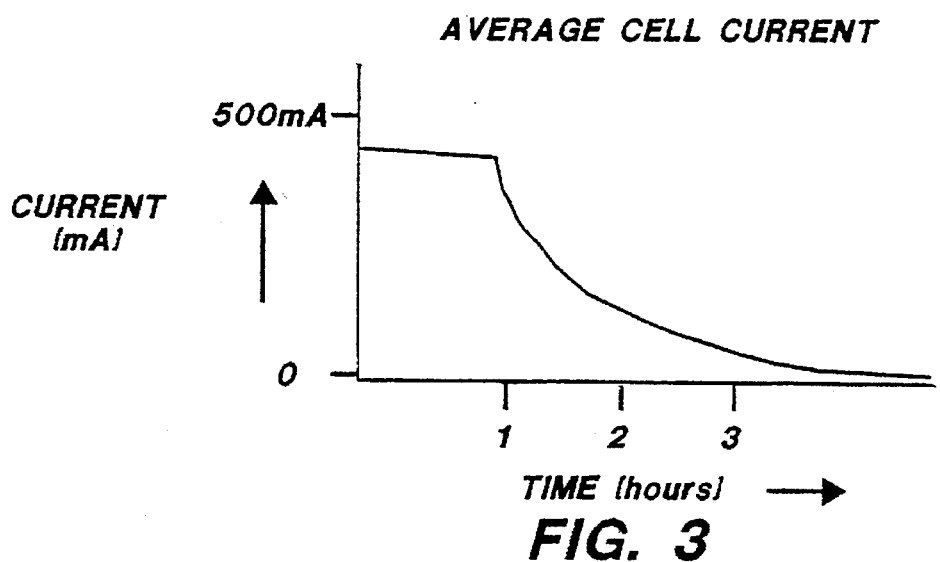
FIG. 3 shows the average current delivered to the cell of FIG. 2.
Figure 4:
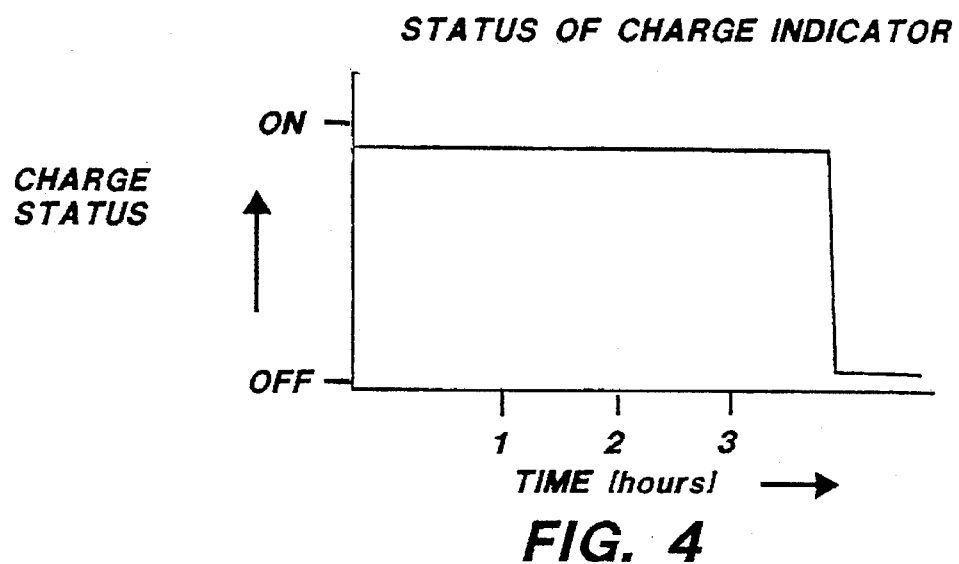
FIG. 4 shows the output signal provided by the charge status indicator of FIG. 1 for the cell of FIGS. 2 and 3.

FIGS. 2 and 3 show, respectively, the average cell voltage and current signals obtained using battery charging system 20. FIG. 4 shows the output signal provided by charge status indicator 120 of FIG. 1, and corresponds to the signals shown in FIGS. 2 and 3.

In a battery charging system of the type shown in FIG. 1, and as shown in FIG. 2, the voltage across cell 30 rises rapidly during the initial portion of the charging cycle, but remains substantially constant thereafter. The portion of the voltage versus time curve of FIG. 2 where voltage remains substantially constant represents a significant portion of the charge cycle. The state of charge of cell 30 corresponding to the constant voltage portion of the charge cycle may therefore range anywhere between 50% and 100% of full capacity.

As shown in FIG. 3, the amplitude of the average charge current provided to cell 30 is much higher during the initial portion of the charge cycle than it is during the remainder of the charge cycle. As the state of charge of cell 30 increases to higher levels, the average current cell 30 accepts decreases. The amplitude of the initial charge current provided by the battery charging system 20 to the cell 30 may be determined by the current delivering capacity of the system 20, or by the characteristics of cell 30 charged therein.

Rechargeable alkaline manganese dioxide cells generally accept charge at a high rate initially, but cannot do so on a continuous basis. Moreover, accurate measurement of the voltage of a rechargeable alkaline manganese dioxide cell cannot be obtained by measuring the CCV of the cell during charging. Instead, only the OCV of a rechargeable alkaline manganese dioxide cell provides an accurate measurement of cell voltage during charging.

Pulse-modulated battery charging system 20 monitors the OCV of cell 30 during charging and provides charge pulses thereto. As the charge cycle continues, charging current provided to cell 30 is progressively decreased through reducing the pulse duty cycle, or by progressively skipping an increasing number of charge pulses. Thus, progressively less current is provided to cell 30 as the charge cycle continues. As shown in FIG. 3, at the end of the charge cycle the average current provided to cell 30 approximates zero; at this point in the charge cycle cell 30 has attained a full state of charge.

FIG. 1 shows the basic components of charging system 20, comprising power source 40, first electronic switch 50, and control circuit 60. Current limiting circuit or component 70 may optionally be included in the system, depending on the specific requirements and characteristics of cell 30 and battery charging system 20. The primary components of control circuit 60 are voltage reference 80, system clock 90, charge enable control circuit 100, cell monitor circuit 110, and charge status detector 120. Control circuit 60 provides battery charging system 20 with the ability to charge cell 30 in accordance with the charge and indication profiles shown in FIGS. 2, 3, and 4.

At the beginning of the charge cycle, when the state of charge of cell 30 is empty or low, and when the OCV corresponding thereto is low, first electronic switch 50 operates at the maximum frequency or duty cycle set by system clock 90. Thus, a maximum charge current, determined by the combination of current limiting circuit or component 70 and the output capacity of power source 40, is provided to cell 30 during the initial portion of the charge cycle. System clock 90 also operates to activate and deactivate cell monitor circuit 110 such that the OCV of cell 30 may be sensed when first electronic switch 50 is open (e.g., when current pulses are not being provided to cell 30).

Charge enable control circuit 100 receives signals corresponding to (a) the OCV of cell 30 from cell monitor circuit 110, and (b) a reference voltage ($V_{ref}$) provided by voltage reference 80. Charge enable control circuit 100 compares the OCV to $V_{ref}$ and then determines whether cell 30 should receive another charge pulse. If the OCV is greater than or equal to $V_{ref}$, charge enable control circuit 100 disables the provision of a charge pulse to cell 30 for the following clock pulse. Charge enable control circuit 100 does not permit first electronic switch 50 to close unless and until the OCV of cell 30 falls below $V_{ref}$.

If cell 30 is only partially charged, its OCV will eventually decay below $V_{ref}$. As soon as charge enable control circuit 100 determines that the OCV is less than $V_{ref}$, the provision of charge pulses to cell 30 is enabled. As the state of charge of cell 30 increases, the relaxation time, or the time required for the OCV to fall below $V_{ref}$, gradually increases. As a result, the number of charge pulses provided to cell 30 over a given period of time decreases as the charge cycle continues, and the characteristic average charge current profile illustrated in FIG. 3 develops. FIG. 4 shows, as a function of time, the output signal provided by the charge status indicator of FIG. 1 for the cell of FIGS. 2 and 3.

The charge enable control signal comprises a series of fixed amplitude pulses having a variable duty cycle. The effective duty cycle decreases as cell 30 reaches a full state of charge. The time-averaged voltage corresponding to the charge enable control signal varies slowly respecting time, and may thus be described as a quasi-DC equivalent, or low-pass filtered equivalent, of the charge enable control signal.

In one embodiment of the invention, the time-averaged, quasi-DC equivalent, or low-pass filtered signal is compared to a reference voltage signal ($V_{min}$). When the voltage of the time-averaged, quasi-DC equivalent, or low-pass filtered signal falls below $V_{min}$, the output of the comparator changes state. This change in state is used to indicate that cell 30 has attained a full state of charge.

In another embodiment of the invention, a microprocessor, digital signal processor, or other software programmable device determines a time-averaged value corresponding to the time-averaged charge enable control signal. The microprocessor compares the time-averaged value to a predetermined reference value. When the time-averaged value is less than the predetermined reference value, an output signal from the microprocessor changes state. This change in state is used to indicate that cell 30 has attained a full state of charge.

In its most basic embodiment, however, the charge status detector of the invention monitors a charge signal, determines a time-averaged value corresponding to the time-averaged charge signal, and detects whether the state of charge of the cell is above a predetermined level by comparing the time-averaged value to a predetermined reference value. The charge signal can be any one of a charge enable control signal, a transistor base drive signal, or a signal from a current transformer disposed between the power source and the cell.

The invention does not directly measure the temperature, voltage, or charge current of the cell, employ logic circuitry to count clock or charge pulses, or measure time explicitly to detect or indicate the state of charge of a cell. Instead, the decaying or gradually decreasing time-averaged value, quasi-DC equivalent, or low-pass filtered equivalent of an oscillating control signal is sensed to detect and indicate the state of charge of the cell.

Figure 5:
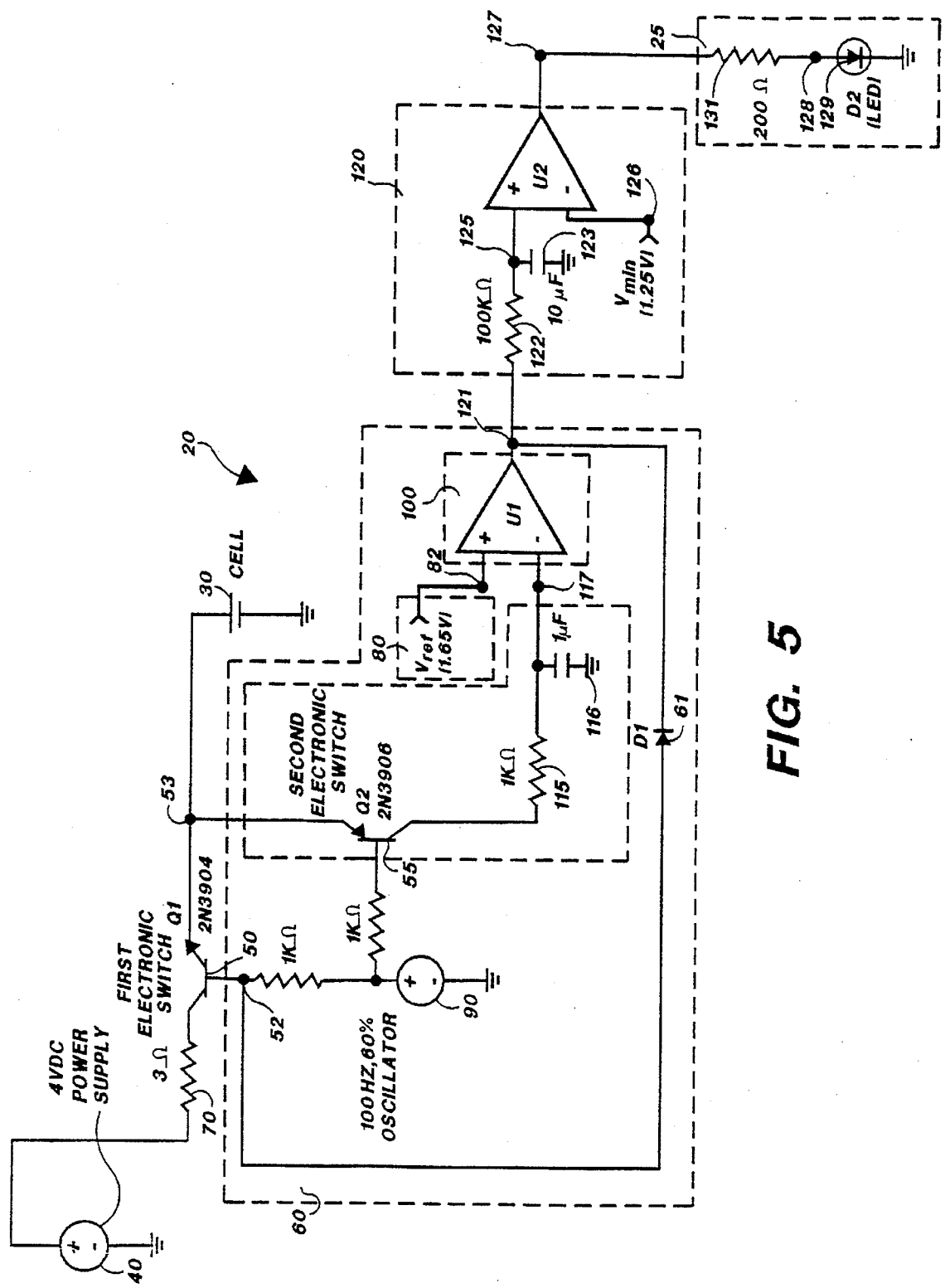
FIG. 5 shows a schematic circuit diagram corresponding to the battery charging system illustrated in FIG. 1, where the circuit has a charge status detector for low-pass filtering a charge enable control signal.

FIG. 5 shows a preferred version of the first basic embodiment of the invention, where charge status detector 120 is a low-pass filter in combination with a comparator. A schematic diagram of a battery charging circuit corresponding to the battery charging system 20 of FIG. 1 is shown in FIG. 5. System 20 includes a preferred embodiment of a state of charge detection and indication circuit 120. Power source 40 is a regulated voltage source that provides a uniform or nearly uniform output voltage of 4 Volts DC. Current limiting component 70 is a 3 Ohm resistor.

First electronic switch 50 (transistor Q1) is a 2N3904 NPN bipolar junction transistor, or any other suitable electronic switching device such as a PNP bipolar junction transistor, or an NMOS or PMOS FET. A positive bias must be applied at node 52 (the base of transistor Q1) in respect of node 53 (the emitter of transistor Q1) to permit current to flow from power source 40 to cell 30. Second electronic switch 55 (transistor Q2) forms a portion of cell monitor circuit 110, and is a 2N3906 PNP bipolar junction transistor, or any other suitable electronic switching device, such as an NPN bipolar junction transistor, or an NMOS or PMOS FET. When NPN transistor Q1 is ON, PNP transistor Q2 is OFF. Correspondingly, when transistor NPN Q1 is OFF, PNP transistor Q2 is ON. Thus, Q1 and Q2 operate as complementary devices. System clock 90 is a 100 Hz, 60% duty cycle oscillator providing an output signal of sufficient amplitude to activate Q1 and Q2.

Reference voltage 80 (or $V_{ref}$) is provided at node 82 as a first input to comparator U1 in charge enable control circuit 100. $V_{ref}$ is generally set at 1.65 Volts, and may be provided by a zener diode, a voltage regulator, a semiconductor voltage reference generator, or any other suitable device or component.

A second input, corresponding to the voltage at node 117, is provided to comparator U1, and is a voltage signal corresponding to the average OCV of cell 30. Most preferably, comparator U1 is an operational amplifier, but may also be a special purpose integrated circuit, or may be formed from discrete electrical or electronic components.

When electronic switch 55 is closed, 1 µF capacitor 116 either accepts charge from cell 30, or discharges across second electronic switch 55 into cell 30. The direction of current flow, into or out of capacitor 116, depends on the sign of the difference in potential existing between capacitor 116 and cell 30. When second electronic switch 55 closes, capacitor 116 attempts to reach the same potential as cell 30. Thus, at any given time during the charge cycle, capacitor 116 stores a charge approximating the average OCV of cell 30.

Comparator U1 compares the relative magnitudes of the voltages at nodes 82 and 117. When the voltage at node 117 is less than $V_{ref}$ at node 82, the voltage at node 121 (the output of comparator U1 ) corresponds to the positive saturation voltage of comparator U1. In the preferred embodiment of the present invention, the positive saturation voltage approximates +5 Volts, depending on operating conditions. The output of comparator U1 is then in a high state, and charge enable control circuit 100 enables the provision of charge current pulses to cell 30. Correspondingly, diode 61 (or D1) is not forward-biased, and no current flows through it. Thus, the voltage at node 52 is sufficiently high to forward-bias transistor Q1 when the output signal system clock 90 is positive.

When the voltage at node 117 equals or exceeds $V_{ref}$ at node 82, the voltage at node 121 changes from the positive saturation voltage of comparator U1 to its negative saturation voltage. In the preferred embodiment of the present invention, the negative saturation voltage approximates zero Volts, depending on operating conditions. The output of comparator U1 then changes to a low state, and charge enable control circuit 100 disables the provision of charge current pulses to cell 30. Under those conditions, diode 61 is forward-biased and therefore conducts current during positive portions of the system clock's output signal. This results in the base of transistor Q1 being held low, whether or not the output signal provided by system clock 90 is high or low. Transistor Q1 therefore remains off until diode 61 stops conducting current.

Next, the output of comparator U1 (the voltage at node 121 ) is low-pass filtered in charge status detector 120. As shown in FIG. 5, charge status detector 120 most preferably comprises comparator U2 and a single-pole low-pass filter network comprising 100 kΩ resistor 122 and 10 µF capacitor 123. Other configurations of the low-pass filter network fall within the scope of the invention, such as multiple pole low-pass or time-averaging filters.

In FIG. 5, the low-pass filtered signal at node 125 is a first input to comparator U2. A second input to comparator U2 is a voltage signal at node 126 approximating 1.25 Volts ($V_{min}$). $V_{min}$ may be derived from $V_{ref}$. The output signal of comparator U2 controls charge status indicator 25, which indicates that cell 30 has attained a full state of charge by, for example, driving LED 129 into the ON state from the OFF state, or, conversely (and as shown in FIGS. 4 and 5) by driving LED 129 into the OFF state from the ON state (as shown in FIGS. 4 and 5).

Providing the voltage at node 125 is greater than the voltage at node 126, the output of comparator U2 remains high. LED 129 (or D2) in charge status indicator 25 then remains lit, and provides a visual indication that cell 30 has not attained a full state of charge. When the voltage at node 125 is less than or equal to the voltage at node 126, the output of comparator U2 changes to a low state. LED 129 then turns off, and provides a visual indication that cell 30 has attained a full state of charge.

Figure 6:
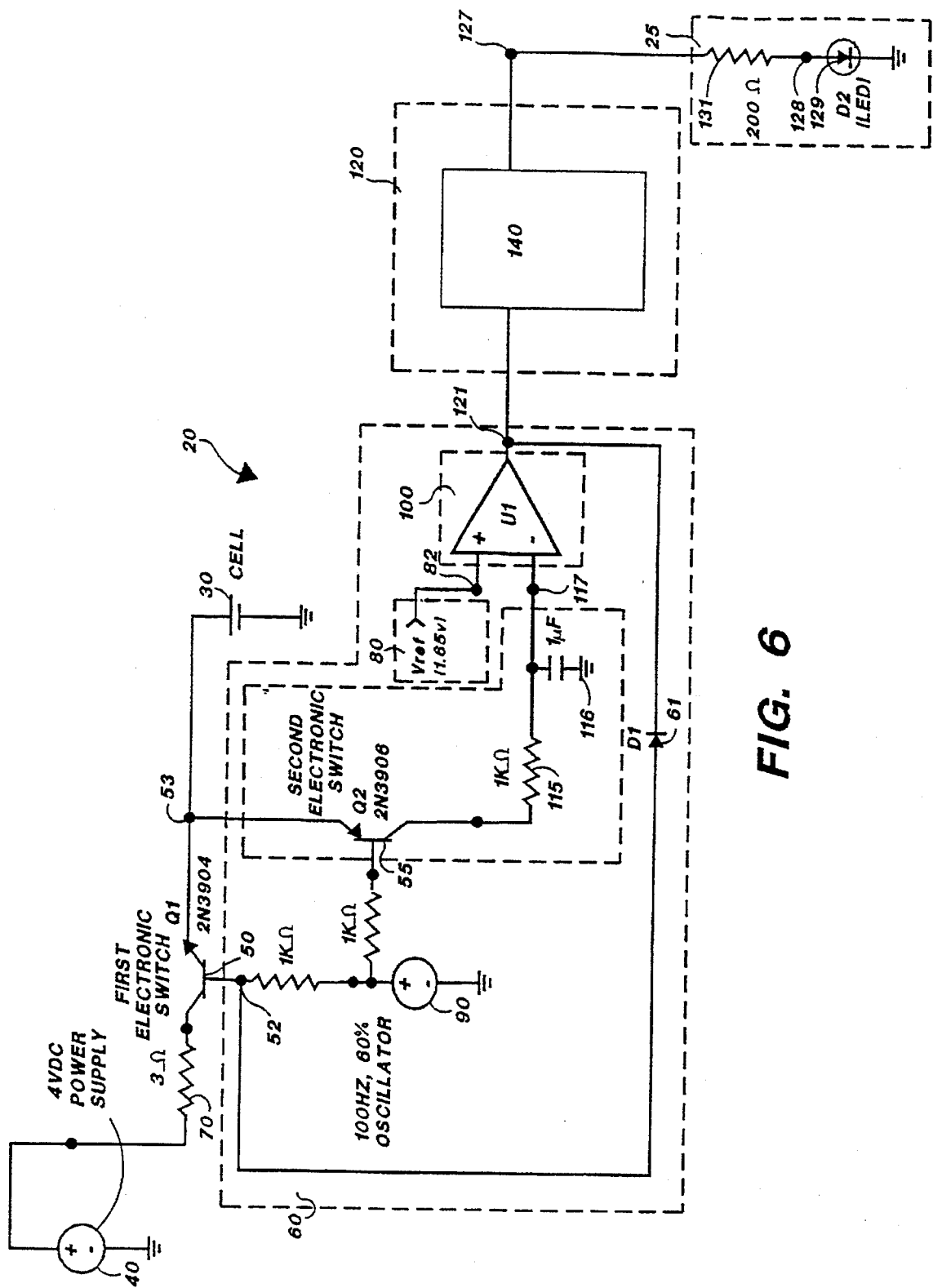
FIG. 6 shows a schematic circuit diagram corresponding to the battery charging system illustrated in FIG. 1, where the circuit has a charge status detector for time-averaging, by microprocessor means, a charge enable control signal.

FIG. 6 shows a preferred version of the second basic embodiment of the invention, where charge status detector 120 comprises a microprocessor, digital signal processor, or other software programmable device. Microprocessor 140 determines a time-averaged value corresponding to the charge enable control signal present at node 121, and compares it to a predetermined reference value. Microprocessor 140 determines the sign and/or magnitude of the difference between the time-averaged value and the predetermined reference value. When the time-averaged value is less than the predetermined reference value, the output signal from the microprocessor appearing at node 127 changes state. This change in state is used to indicate that cell 30 has attained a full state of charge.

Providing the time-averaged value calculated by microprocessor 140 is greater than the predetermined reference value, the output signal of microprocessor 140 remains high. LED 129 (or D2) in charge status indicator 25 then remains lit, and provides a visual indication that cell 30 has not attained a full state of charge. When the time-averaged value is less than or equal to the predetermined value, the output signal of microprocessor 140 changes to a low state. LED 129 then turns off, and provides a visual indication that cell 30 has attained a full state of charge.

To illustrate the operation of microprocessor 140, we select a nominal clock frequency of 10 kHz for microprocessor 140. The period of the clock pulses of microprocessor 140 is therefore 0.1 milliseconds (ms). For illustrative purposes we further deem that microprocessor 140 executes logical instructions at a rate of one instruction every two clock cycles, and input/output (I/O) operations and branch instructions every 3 clock pulses.

In FIG. 6, Microprocessor 140 samples the analog voltage at node 121 (the charge enable control signal), and converts it into a corresponding digital equivalent by means of an internal ND converter. System clock 90 operates at a frequency of 100 Hz with a 60% duty cycle. System clock 90 therefore outputs a sequence of repeating signals having an ON pulse 6 milliseconds in duration followed by an OFF pulse 4 milliseconds in duration. The period of the repeating signal is therefore 10 ms.

Figure 7A:
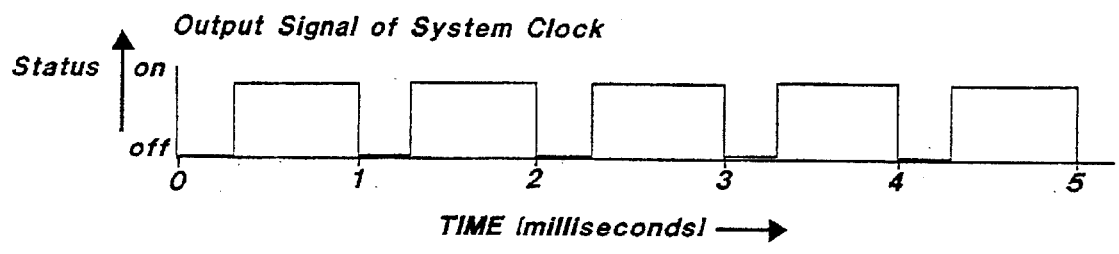
FIG. 7(a) shows the repeating output signal of the system clock.

FIG. 7(a) shows the output signal of system clock 90. Microprocessor 140 samples the charge enable control signal at node 121 once every millisecond. This corresponds to a sample rate ten times greater than the fundamental frequency established by system clock 90, thereby preventing any possibility of the charge enable control signal being aliased in microprocessor 140.

Figure 7B:
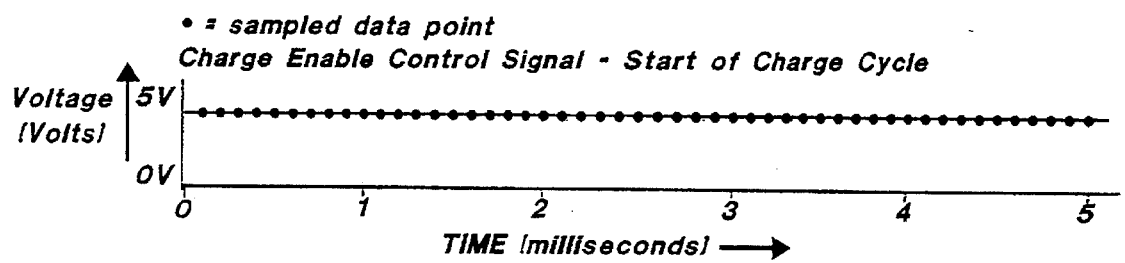
FIG. 7(b) shows the charge enable control signal at the start of the charge cycle, with microprocessor sample times superimposed thereon.

FIG. 7(b) shows when microprocessor 140 samples the charge enable control signal during the beginning of the charge cycle. Dots indicate the times at which the charge enable control signal is sampled by the microprocessor. As illustrated in FIG. 7(b), in the beginning of the charge cycle the state of charge of cell 30 is low, and the charge enable control signal is almost always high. In the example of FIG. 7(b), the time-averaged value corresponding to the average charge enable control signal is +5 Volts, or 50 samples at +5 Volts divided by 50. Microprocessor 140 compares the +5 Volt time-averaged value to a predetermined reference value of 0.5 Volts, determines that the time-averaged value exceeds the predetermined reference value, and causes a high +5 Volt signal to appear at its output. The output signal from microprocessor 140 appearing at node 127 is high, and drives LED 129 ON. LED 129 remains lit to indicate that the state of charge of cell 30 is less than full.

Figure 7C:
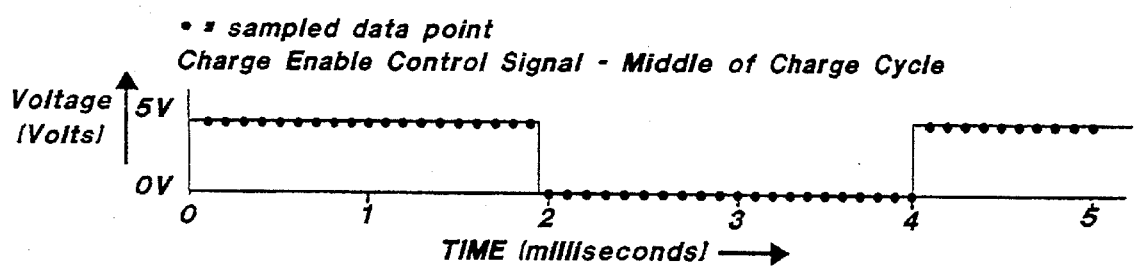
FIG. 7(c) shows the charge enable control signal at the middle of the charge cycle, with microprocessor sample times superimposed thereon.

FIG. 7(c) shows when microprocessor 140 samples the charge enable control signal during the middle of the charge cycle. Dots indicate the times at which the charge enable control signal is sampled by the microprocessor. As illustrated in FIG. 7(c), in the middle of the charge cycle the state of charge of cell 30 is somewhere between low and full, and the charge enable control signal alternates between high and low. In the example of FIG. 7(c), the time-averaged value corresponding to the average charge enable control signal is 2.9 Volts, or 29 samples at +5 Volts and 21 samples at 0 Volts divided by 50. Microprocessor 140 compares the +2.9 Volt time-averaged value to a predetermined reference value of 0.5 Volts, determines that the time-averaged value exceeds the predetermined reference value and causes a high +5 Volt signal to appear at its output. The output signal from microprocessor 140 appearing at node 127 is high, and drives LED 129 ON. LED 129 remains lit to indicate that the state of charge of cell 30 is less than full.

Figure 7D:
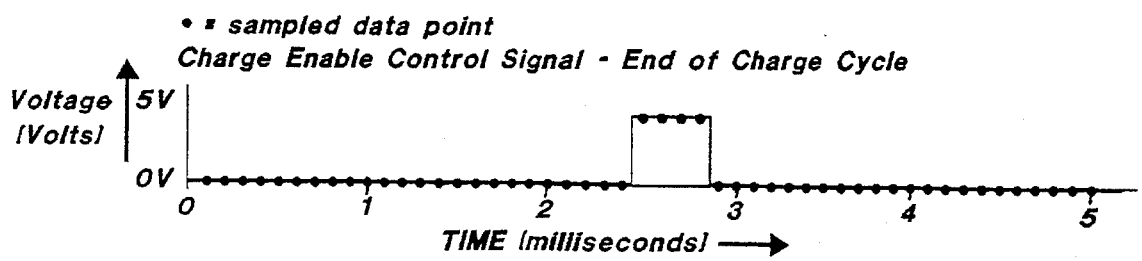
FIG. 7(d) shows the charge enable control signal at the end of the charge cycle, with microprocessor sample times superimposed thereon.

FIG. 7(d) shows when microprocessor 140 samples the charge enable control signal during the end of the charge cycle. Dots indicate the times at which the charge enable control signal is sampled by the microprocessor. As illustrated in FIG. 7(d), at the end of the charge cycle the state of charge of cell 30 is almost full, and the charge enable control signal almost always low. In the example of FIG. 7(d), the time-averaged value corresponding to the average charge enable control signal is 0.4 Volts, or 46 samples at 0 Volts and 4 samples at +5 Volts divided by 50. Microprocessor 140 compares the +0.4 Volt time-averaged value to a predetermined reference value of 0.5 Volts, determines that the time-averaged value is less than the predetermined reference value, and causes a low 0 Volt signal to appear at its output. The output signal from microprocessor 140 appearing at node 127 is low, and drives LED 129 OFF, thereby indicating that the state of charge of cell 30 is full.

Table 1 below is an example of a set of high-level functional statements approximating the low-level machine code statements used in microprocessor 140 for sampling the charge enable control signal, computing a time-averaged value thereof, comparing the time-averaged value to a predetermined reference value, and providing an output signal for driving a state of charge indicator.

TABLE 1

Functional Statements for a Microprocessor
Controlling a State of Charge Indicator
(MOVING_AVERAGE Function)

| Functional Block | Statement | Comments |
| --- | --- | --- |
| START: | avg = sum = index = 0 | initialize all variables; |
|  | led_out = 1 | turn on LED 129 to indicate charge is in progress; |
| SAMPLE: | measure v_ctrl | read I/O port to sample the charge enable control signal (3 clock cycles required); |
|  | sum = sum + v_ctrl | add currently sampled value to previously sampled value (2 clock cycle required); |

TABLE 1-continued

Functional Statements for a Microprocessor
Controlling a State of Charge Indicator
(MOVING_AVERAGE Function)

| Functional Block | Statement | Comments |
|---|---|---|
| | index = index + 1 | increment counter (2 clock cycle required); |
| | if (index < 51) then goto first step of SAMPLE, else goto first step of COMPUTE | repeat SAMPLE operation if counter sum is less than 51, go to next step otherwise (3 clock cycles required); |
| COMPUTE: | avg = sum/50 | compute time-averaged value of charge enable control signal; |
| | if (avg < 0.5) goto DONE, else goto first step of START | if time-averaged value is less than 0.5V, then go to next step; otherwise go to first step of START; |
| DONE: | led_out = 0 | turn LED 179 off to indicate the state of charge of cell 30 is full. |

In Table 1, samples are acquired during the SAMPLE loop. The SAMPLE loop requires 10 clock cycles to complete, or 1 millisecond. Thus, microprocessor 140 samples the charge enable control signal ten times during every period of the output signal of system clock 90. Fifty samples acquired by microprocessor 140 correspond to 5 complete cycles of the output signal of system clock 90. In the example of Table 1, the threshold for turning LED 129 off is set at 0.5 Volts, when the charge enable control signal is high only ten percent of the time during which it is sampled. Those of ordinary skill in the art will understand, however, that the threshold can be set at any desired level, depending on the particular application, and cell chemistry or type involved.

Examples of microprocessors suitable for use in charge status detector 120 include, but are not limited to, the Zilog Z8 family of microprocessors, Signetics 87C752 microprocessors, and SGS Thomson ST6 microprocessors.

Devices other than LEDs may be used as means for indicating the state of charge of cell 30, such as audio alarms or buzzers, incandescent bulbs or electromechanical actuators. An electromechanical actuator may move into a "full charge" position from a "less than full charge" position when a full state of charge has been attained in cell 30. The polarity of charge status indicator 120 may be reversed so that the indicator is not lit during the charging, but becomes lit when a full state of charge has been attained in cell 30. Various other modifications, some of which are described below, may be made to charge status detector 120, without departing from the scope and spirit of the present invention.

Figure 8:
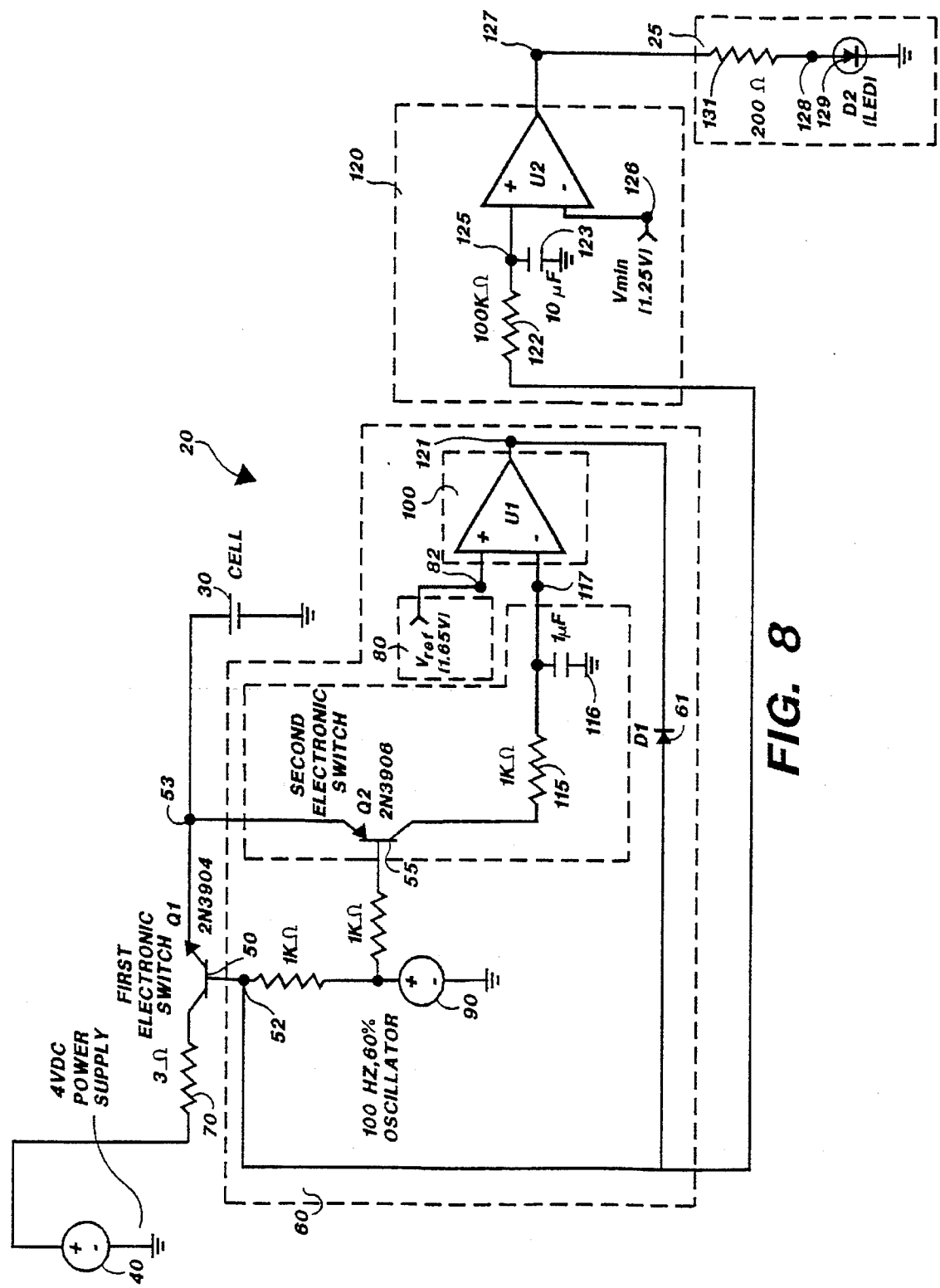
FIG. 8 shows a schematic circuit diagram corresponding to the battery charging system illustrated in FIG. 1, where the circuit has a charge status detector for low-pass filtering a transistor base drive signal.

For example, the base drive signal at node 52 may be the input signal (or charge signal) to charge status detector 120 instead of the charge enable control signal at node 121. FIG. 8 shows such an alternative embodiment of charge status detector 120. In FIG. 8, unlike in FIG. 5, the charge enable control signal appearing at the output of comparator U1 is not fed to the input of the low-pass filter network comprising resistor 122 and capacitor 123. Instead, the charge enable control signal is routed directly to node 52 through diode 61. The input signal to the low-pass filter network of charge status indicator 120 is the transistor base drive signal appearing at node 52.

Referring to FIG. 5, in another embodiment of the invention a current transformer may be placed between node 53 and cell 30 to monitor the charge pulses provided to the cell. A charge signal corresponding to the charge pulses is the input to charge status detector 120.

Figure 9:
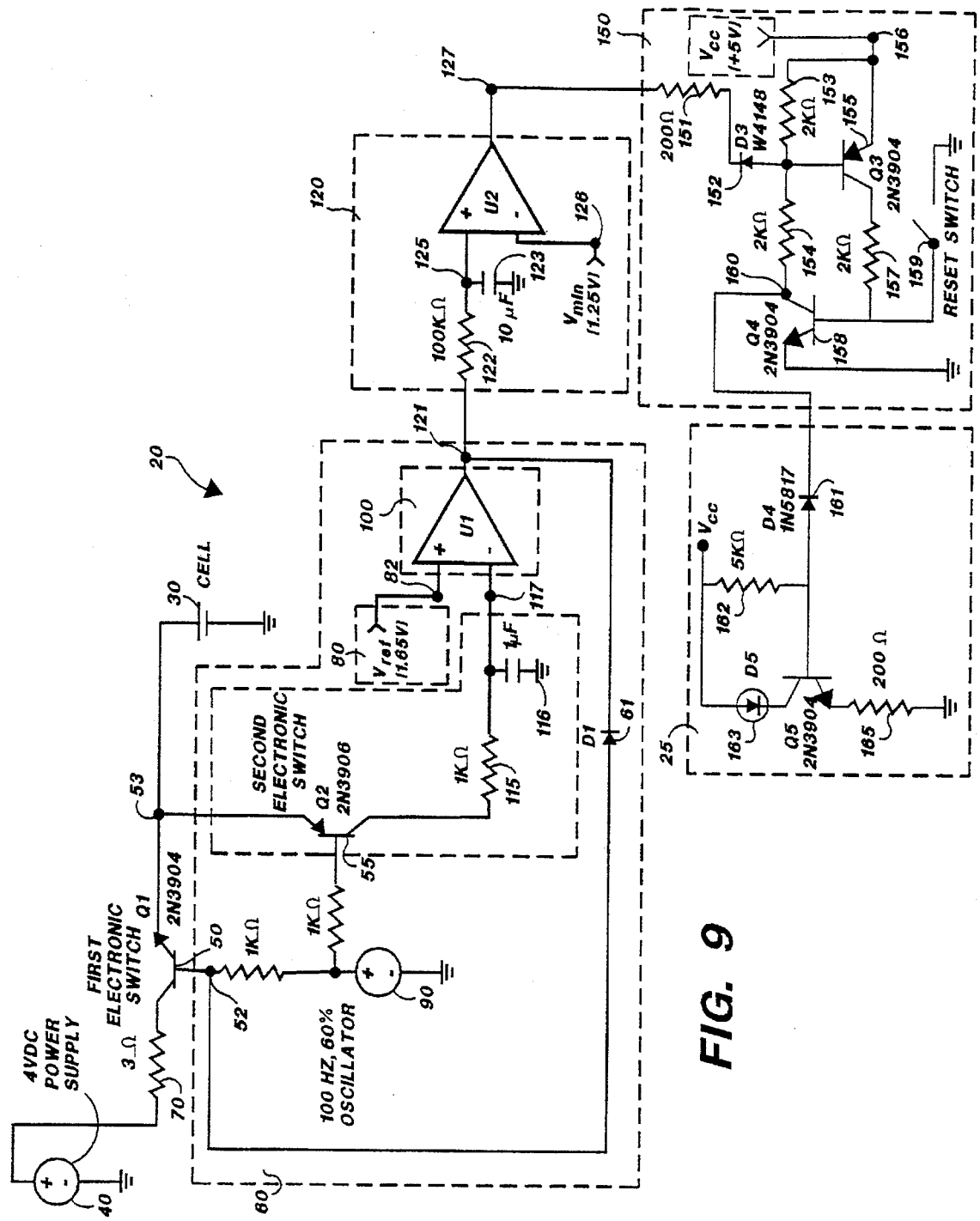
FIG. 9 shows the circuit of FIG. 5, further including a latching circuit.

A latching circuit, such as a flip-flop, an SCR, or an IC device performing a latching function, may be disposed at node 127 between charge status detector 120 and charge status indicator 25. FIG. 9 shows a preferred version of latching circuit 150. Transistor 155 (or Q3) is a 2N3906 PNP BJT, and transistor 158 (or Q4) is a 2N3904 NPN BJT. The voltage appearing at node 160 is initially high at +5 Volts. When the output of charge status detector goes low because a full state of charge in cell 30 has been detected, the voltage appearing at the base of transistor Q3 changes from +5 Volts to 0 Volts, causing transistor Q3 to turn on. In response to transistor Q3 turning on, the base-emitter junction of transistor Q4 becomes forward biased and transistor Q4 turns on. As soon as transistor Q4 turns on, the voltage appearing at node 166 changes from +5 Volts to 0 Volts. LED 163 then turns off, and visually indicates that cell 30 has attained a full state of charge. The voltage at node 166 stays low until latching circuit 150 is reset by closing and opening reset switch 159, by resetting power to battery charging system 20, or by removing cell 30 from battery charging system 20.

Hysteretic control may also be implemented in comparator U2. For example, when the average value of the charge enable signal becomes less than $V_{min}$, the output of comparator U2 having hysteretic control causes LED 129 or 163 to turn off. Thereafter, comparator U2 having hysteretic control does not permit LED 129 or 163 to become relit until the charge enable signal attains a value greater than $V_{min}$ by some predetermined amount or percentage (e.g., the hysteresis window magnitude).

Figure 10:
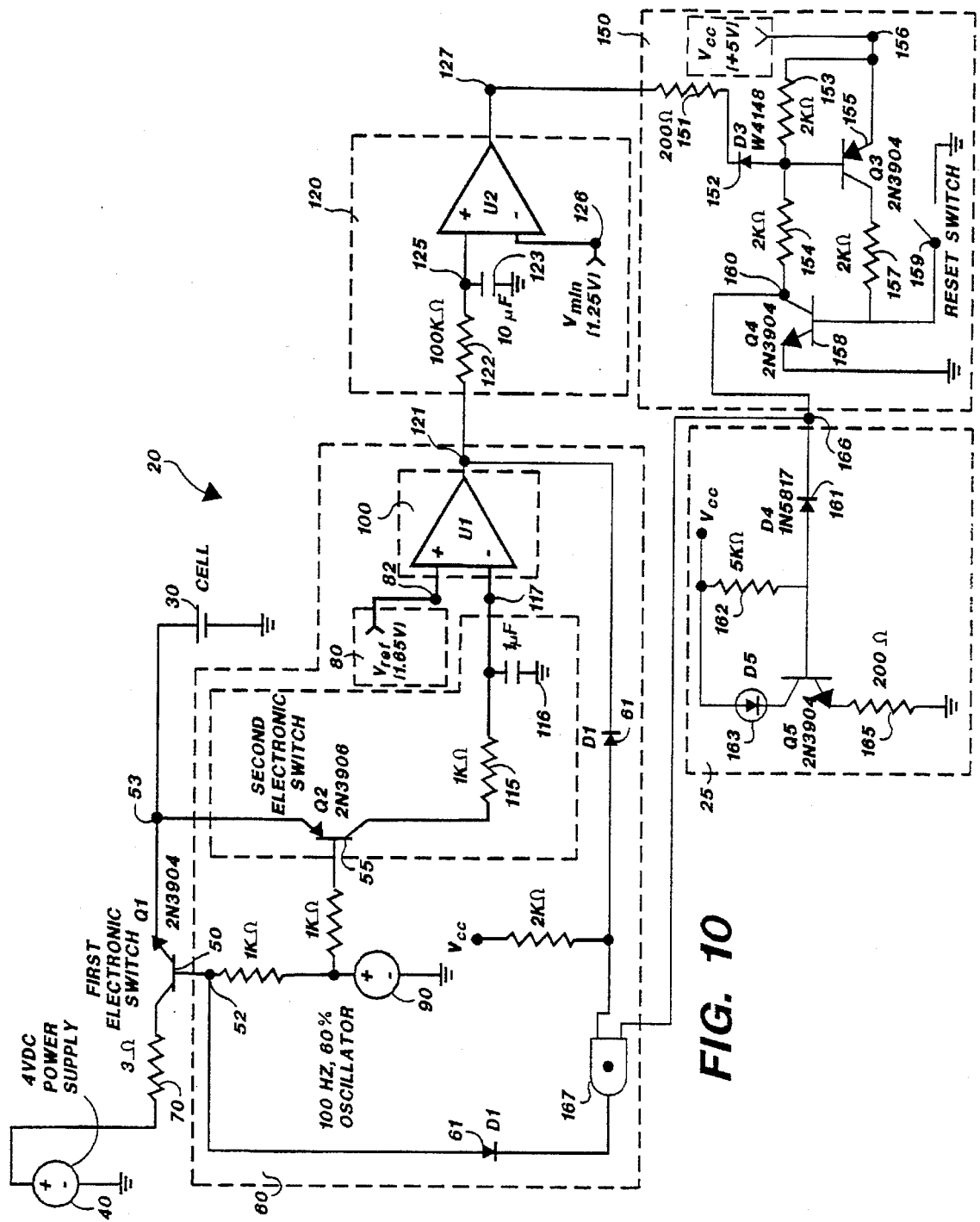
FIG. 10 shows the circuit of FIG. 9, further including an overcharge protection circuit.
Figure 11:
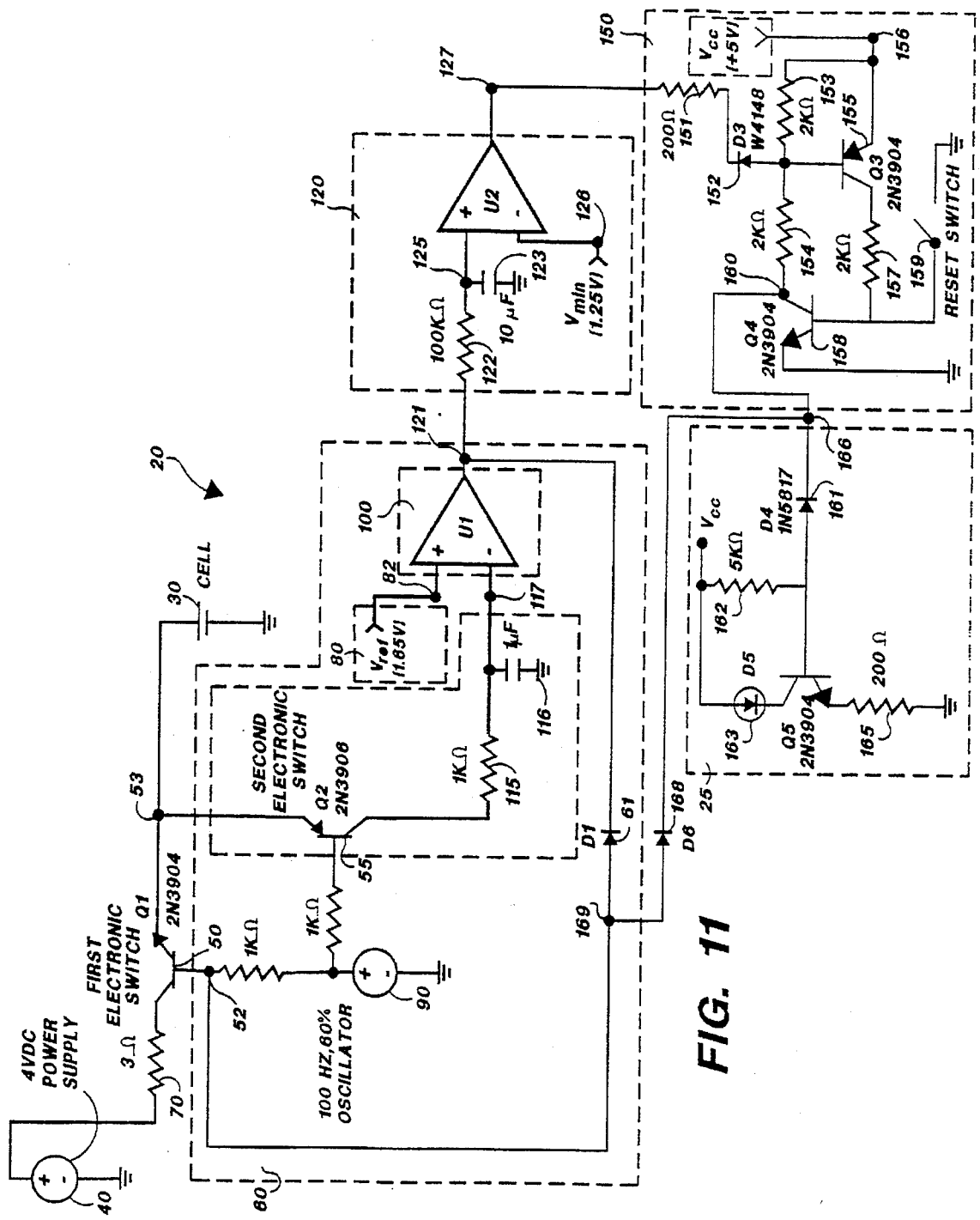
FIG. 11(a) shows a modeled charge enable control signal of the battery charging system of FIG. 5 at the beginning of the charge cycle.
FIG. 11(b) shows a modeled voltage across a rechargeable alkaline manganese dioxide cell as it is charged by the battery charging system of FIG. 5 and in accordance with the charge enable control signal of FIG. 11(a)
FIG. 11(c) shows the charge enable control signal of FIG. 11(a) after it has been low-pass filtered in accordance with the present invention.
FIG. 11(d), corresponding to FIGS. 11(a) through 11(c), shows the modeled current delivered to LED indicator 129 of FIG. 5.

Overcharging of cell 30 may be prevented by modifying the circuits of FIGS. 5, 6, 8, or 9 such that the output of charge status detector 120 or latching circuit 150 is used to turn power supply 40 off when a full state of charge in cell 30 is detected. FIGS. 10 and 11 show two such overcharge protection circuits.

In FIG. 10, AND gate 167 receives the voltage at node 166 and the charge enable control signal as two inputs. When latching circuit 150 produces a low voltage at node 166 in response to a full state of charge in cell 30 being detected at charge status detector 120, AND gate 167 produces a low output signal at the cathode of diode 61, even if the charge enable control signal goes high. When AND gate 167 produces a low output signal, the voltage at node 52 is pulled down and remains low until AND gate 167 produces a high output, thereby disabling the provision of additional current to cell 30 through transistor Q1. If the output of AND gate 167 is high, diode 61 is reverse biased, and transistor Q1 is modulated by the output signal of system clock 90.

FIG. 11 shows an alternative means of performing the same logical function provided by AND gate 167 in FIG. 10. In FIG. 11, diode 168 (or D6) lies between nodes 166 and 169. When the voltage at node 166 changes from 5 to 0 Volts, the voltages at node 169 and 52 are pulled down to ground. This disables the provision of additional current to cell 30 through transistor Q1. Transistor Q1 does not conduct current from power supply 40 to cell 30 again until its base-emitter junction becomes forward biased (e.g., when the voltage at node 166 goes back up to +5 Volts).

The program PSPICE was used to model the response of the battery charging system 20 and cell 30 shown in FIG. 5. Input parameters to the PSPICE program were chosen according to the circuit and corresponding values of discrete components shown in FIG. 5. Cell 30 was modeled using an equivalent circuit comprising resistors, capacitors, and a voltage source.

In actual practice, the width of each charge pulse may be on the order of a few milliseconds, while the time required for cell 30 to reach a full state of charge may be several hours. For scaling and illustrative purposes the equivalent circuit for cell 30 was adjusted so that the duration of the charge cycle was reduced significantly relative to what it is in actual practice. The reduced charge cycle duration permitted a reasonable number of individual charge pulses and instantaneous cell and circuit voltage and current signals to be observed in plots generated by PSPICE. This eliminated the need to observe hundreds of thousands of pulses, voltages, and currents that would otherwise have been generated over an entire charge cycle.

FIGS. 12(a) through 12(d) show responses calculated by PSPICE over the initial portion of the charge cycle only for different portions of the circuit shown in FIG. 5. Time scales in FIGS. 12(a)–(12(d) correspond to one another.

Figure 12A:
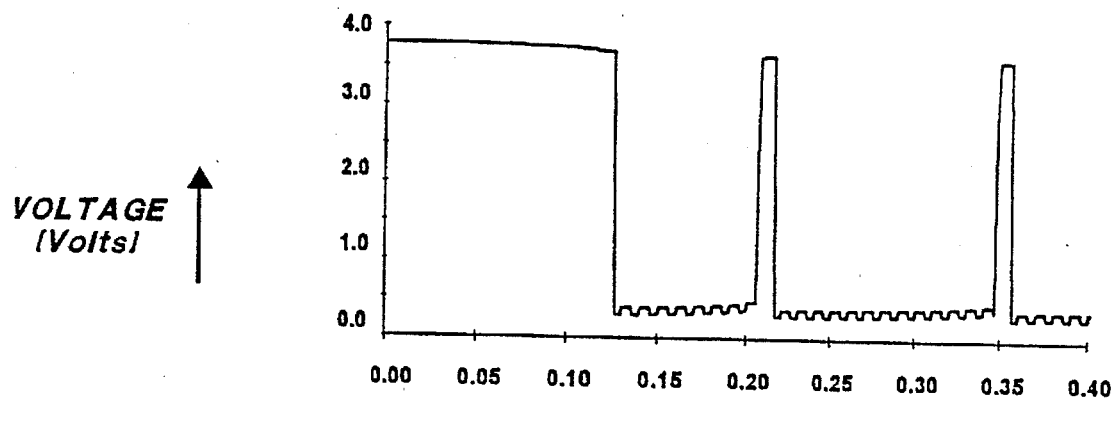
FIG. 12(a) shows a modeled charge enable control signal of the battery charging system of FIG. 5 during an entire charge cycle.

FIG. 12(a) shows the voltage at node 121 (the charge enable control signal) calculated by PSPICE. The charge enable control signal remains high until about 0.13 seconds, when the output of comparator U1 changes to the low state, and charging of cell 30 through first electronic switch 50 is disabled. In FIG. 12(a), the output signal of system clock 90 is superimposed on the charge enable control signal Whenever the output of comparator U1 is low. At about 0.21 seconds the charge enable control signal goes high in response to $V_{min}$ being less than the open circuit voltage of cell 30. The charge enable signal remains high for a brief period of time, and then goes low.

Figure 12B:
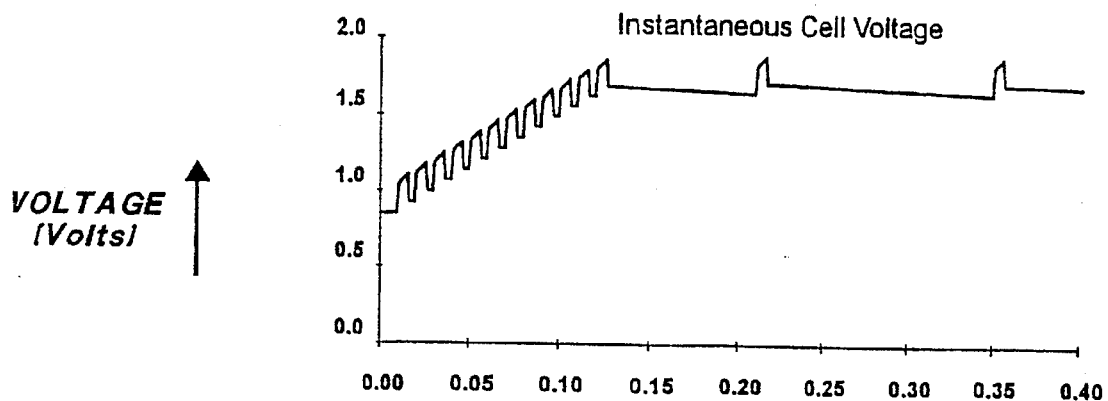
FIG. 12(b) shows a modeled voltage across a rechargeable alkaline manganese dioxide cell as it is charged by the battery charging system of FIG. 5 and in accordance with the charge enable control signal of FIG. 12(a)

FIG. 12(b) shows the voltage across cell 30 at node 53 calculated by PSPICE. The voltage of cell 30 increases initially until an OCV corresponding to $V_{ref}$ is attained. Thereafter, the corresponding charge enable control signal, as shown in FIG. 12(a), is held in the OFF state until the voltage of cell 30 relaxes sufficiently to trigger the output of comparator U1 to change to the high state. As the state of charge of cell 30 increases during the charge cycle, the time required for the voltage of cell 30 to relax below $V_{ref}$ gradually increases. This, in turn, results in a gradual decrease in the effective duty cycle of the charge enable control signal, as shown in FIG. 12(a).

Figure 12C:
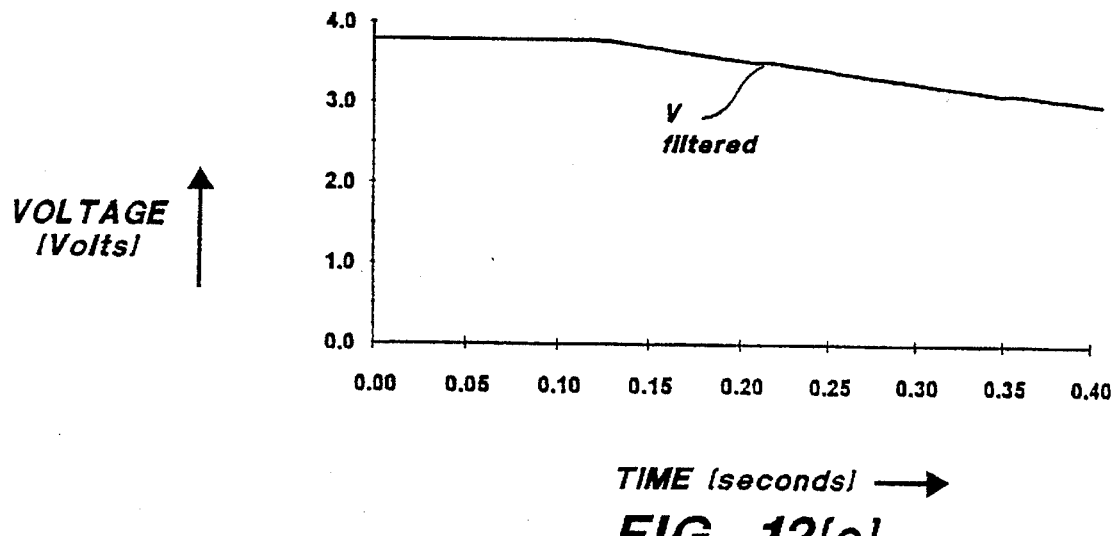
FIG. 12(c) shows the charge enable control signal of FIG. 12(a) after it has been low-pass filtered in accordance with the present invention, and FIG. 12(d), corresponding to FIGS. 12(a) through 12(c), shows the modeled current delivered to LED indicator 129 of FIG. 5.
Figure 12D:
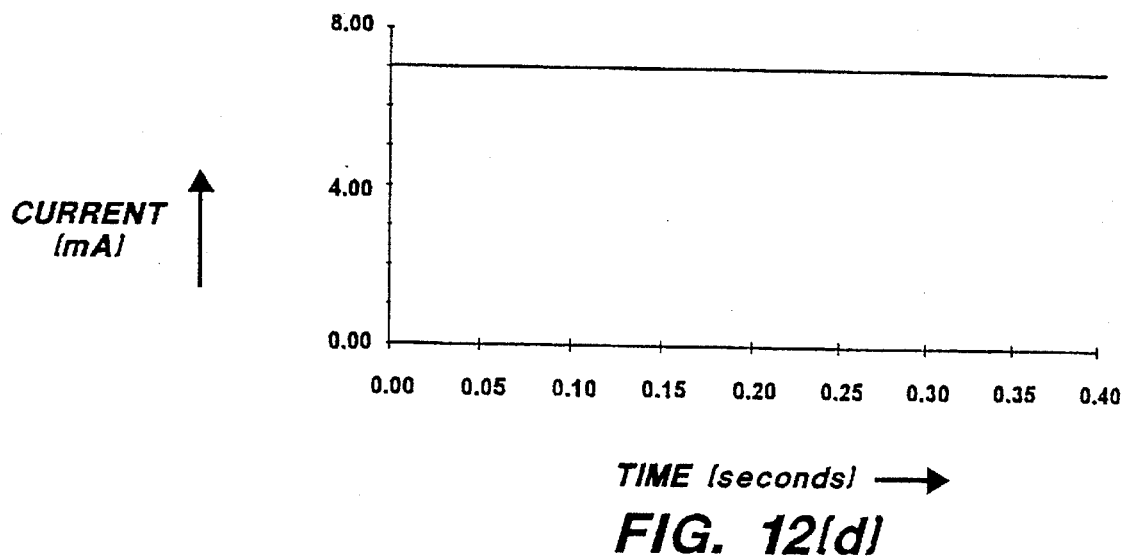

FIG. 12(c) shows the low-pass filtered charge enable control signal at node 125 ($V_{filtered}$) calculated by PSPICE. $V_{filtered}$ decreases slowly and relatively smoothly respecting time. FIG. 12(d) shows the current through LED 129 calculated by PSPICE. In FIG. 12(d), LED 129 remains ON during the initial portion of the charge cycle.

FIGS. 13(a) through 13(d) show responses calculated by PSPICE over the entire charge cycle for different portions of the circuit shown in FIG. 5. Time scales in FIGS. 13(a)–13(d) correspond to one another.

Figure 13A:
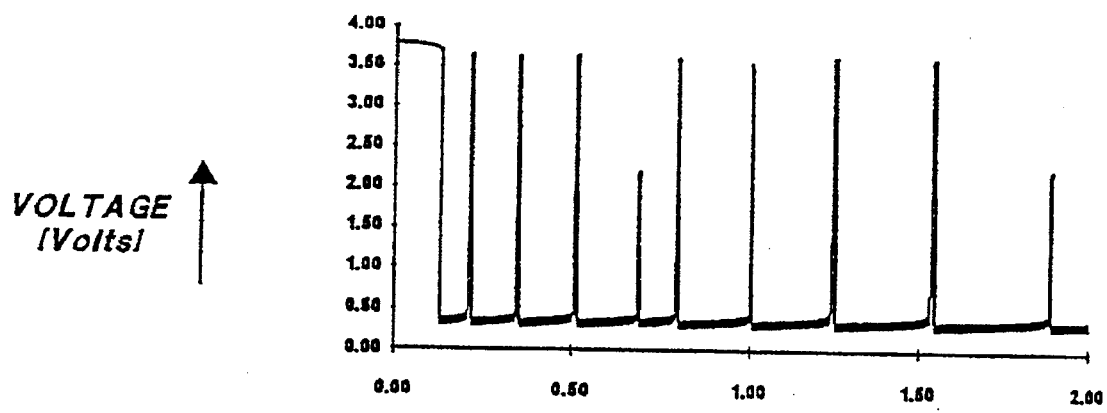

FIG. 13(a) shows the voltage at node 121 (the charge enable control signal) calculated by PSPICE. FIG. 13(a) shows that as time increases the time between charge pulses gradually increases.

Figure 13B:
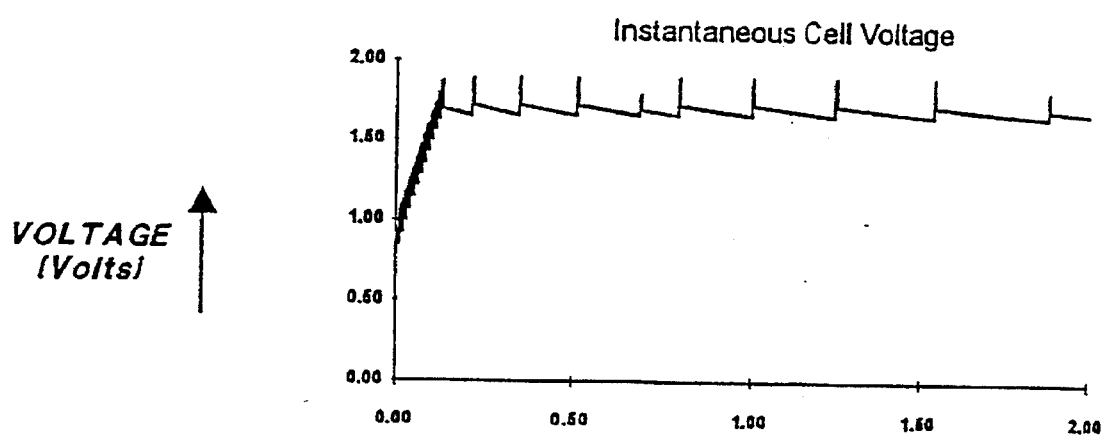

FIG. 13(b) shows the voltage across cell 30 at node 53 calculated by PSPICE. The voltage of cell 30 rises quickly, and then plateaus. The plateau has small pulses superimposed upon it, where the voltage of cell 30 rises quickly, and then decays. The timing of the onset of the superimposed pulses corresponds to the charge pulses shown in FIG. 13(a). The average of the voltage signal shown in FIG. 13(b) corresponds roughly to the voltage profile shown in FIG. 2, supra.

Figure 13C:
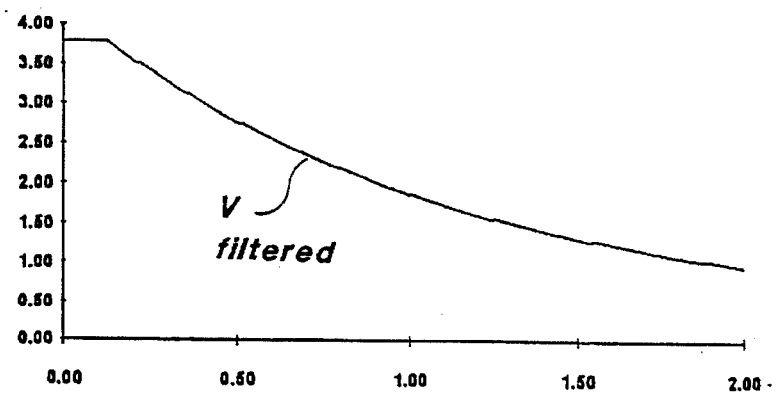

FIG. 13(c) shows the low-pass filtered charge enable control signal ($V_{filtered}$) at node 125 calculated by PSPICE. $V_{filtered}$ decreases slowly and relatively smoothly respecting time. As the time between charge pulses increases, the average value of $V_{filtered}$ decreases. When $V_{filtered}$ at node 125 drops to 1.25 volts (the value corresponding to $V_{min}$), the output of charge status detector 120 changes to the low state, and LED 129 turns off.

Figure 13D:
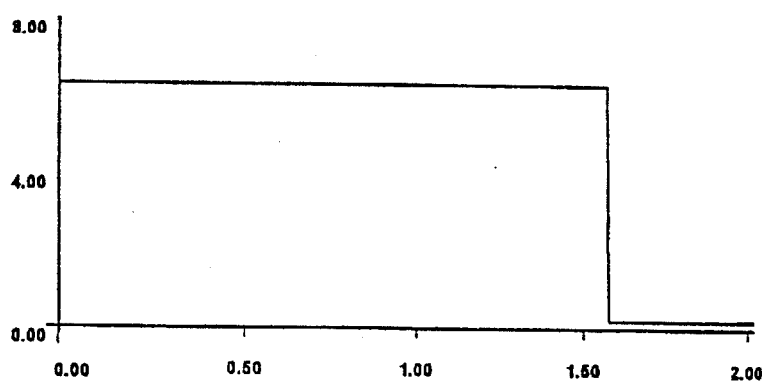

FIG. 13(d) shows the current delivered to LED 129, as calculated by PSPICE between nodes 127 and 128 through 200 $\Omega$ resistor 131. FIG. 13(d) shows that LED 129 remains ON during the initial portion of the charge cycle, but turns OFF at about 1.6 seconds, when $V_{filtered}$ equals $V_{min}$.

The particular embodiment of the invention set forth herein relates to a circuit for detecting or indicating the state of charge of one or a plurality of rechargeable alkaline manganese dioxide cells. Those of ordinary skill in the art will recognize immediately, however, that the present invention is not limited in scope or spirit to applications for rechargeable alkaline manganese dioxide cells only. The present invention includes within its scope battery or electrochemical cell state of charge detection and indication circuits for all types of electrochemical cells and batteries. For example, the invention may be used in any circuit or battery charging system that utilizes a voltage-controlled, pulse modulated method of charging, secondary battery charging systems for rechargeable lithium ion or rechargeable lithium batteries, or battery "fuel gauging" systems for detecting or indicating the instantaneous state of charge of a battery or cell.

Those of ordinary skill in the art will therefore understand that various modifications and variations may be resorted to without departing from the spirit and scope of the present invention, and that such modifications and variations, together with other equivalent embodiments, are within the purview and scope of the appended claims.

We claim:

1. A method of detecting a state of charge of an electrochemical cell being charged with current pulses in a battery charger, comprising the steps of:
   a. monitoring a charge signal;
   b. determining a time-averaged value corresponding to an average of the monitored charge signal over a selected period of time; and
   c. detecting whether the state of charge of the cell is above a predetermined level by comparing the time-averaged value to a predetermined reference value.

2. The method of claim 1, further comprising the step of indicating the state of charge of the cell.

3. The method of claim 1, further comprising the step of visually indicating the state of charge of the cell.

4. The method of claim 2, further comprising the step of visually indicating the state of charge of the cell using an LED.

5. The method of claim 4, further comprising the step of turning the LED ON from the OFF state when the time-averaged value is less than the predetermined reference value.

6. The method of claim 4, further comprising the step of turning the LED OFF from the ON state when the time-averaged value is less than the predetermined reference value.

7. A method of detecting a state of charge of an electrochemical cell being charged with current pulses in a battery charger, comprising the steps of:
   a. charging a capacitor through a resistor when the cell is being charged, the capacitor having an instantaneous voltage thereacross;
   b. discharging the capacitor through the resistor when the cell is not being charged;
   c. detecting whether the state of charge of the cell is above a predetermined level by comparing, in a comparator, the instantaneous voltage to a reference voltage, the output of the comparator changing from a first voltage to a second voltage when the instantaneous voltage is less than the reference voltage.

8. The method of claim 7, further comprising the step of visually indicating the state of charge of the cell using an LED.

9. The method of claim 8, further comprising the step of turning the LED ON from the OFF state when the second voltage appears at the output of the comparator.

10. The method of claim 8, further comprising the step of turning the LED OFF from the ON state when the second voltage appears at the output of the comparator.

11. The method of claim 7, further comprising the step of latching the output of the comparator when the second voltage appears at the output thereof.

12. The method of claim 7, further comprising the step of disabling the provision of charging current to the cell when the second voltage appears at the output of the comparator.

13. A method of detecting a state of charge of an electrochemical cell being charged with current pulses in a battery charger, comprising the steps of:
   a. charging a capacitor through a resistor when a charge signal is present, the capacitor having an instantaneous voltage thereacross;
   b. discharging the capacitor through the resistor when the charge signal is not present;
   c. detecting whether the state of charge of the cell is above a predetermined level by comparing, in a comparator, the instantaneous voltage to a reference voltage, the output of the comparator changing from a first voltage to a second voltage when the instantaneous voltage is less than the reference voltage.

14. The method of claim 13, wherein the charge signal is a charge control enable signal.

15. The method of claim 13, wherein the charge signal is a transistor base drive signal.

16. The method of claim 13, further comprising the step of visually indicating the state of charge of the cell using an LED.

17. The method of claim 16, further comprising the step of turning the LED ON from the OFF state when the second voltage appears at the output of the comparator.

18. The method of claim 17, further comprising the step of turning the LED OFF from the ON state when the second voltage appears at the output of the comparator.

19. A method of detecting a state of charge of an electrochemical cell being charged with current pulses in a battery charger, comprising the steps of:
   a. providing a charge signal to an input of a microprocessor;
   b. determining, in the microprocessor, a time-averaged value of the charge signal corresponding to an average of the charge signal over a selected period of time; and
   c. detecting whether the state of charge of the cell is above a predetermined level by comparing, in the microprocessor, the time-averaged value and a predetermined reference value stored in the microprocessor, an output signal of the microprocessor changing from a first voltage to a second voltage when the time-averaged value is less than the predetermined reference value.

20. The method of claim 19, wherein the charge signal is a charge control enable signal.

21. The method of claim 19, wherein the charge signal is a transistor base drive signal.

22. The method of claim 19, further comprising the step of visually indicating the state of charge of the cell using an LED.

23. The method of claim 22, further comprising the step of turning the LED ON from the OFF state when the second voltage appears at the output of the comparator.

24. The method of claim 22, further comprising the step of turning the LED OFF from the ON state when the second voltage appears at the output of the comparator.

25. A method of detecting a state of charge of an electrochemical cell being charged with current pulses, comprising the steps of:
   a. providing a charge signal as an input to a low pass filter;
   b. filtering the charge signal in the low-pass filter to produce a low-pass filtered signal;
   c. providing the low-pass filtered signal to a first input of a comparator;
   d. providing a reference signal to a second input of the comparator, and
   e. detecting the state of charge of the cell by comparing, in the comparator, the low-pass filtered signal to the reference signal, the output of the comparator changing from a first voltage to a second voltage when the voltage of the filtered signal is less than the voltage of the reference voltage.

26. The method of claim 25, wherein the charge signal is a charge control enable signal.

27. The method of claim 25, wherein the charge signal is a transistor base drive signal.

28. The method of claim 25, further comprising the step of visually indicating the state of charge of the cell using an LED.

29. The method of claim 28, further comprising the step of turning the LED ON from the OFF state when the second voltage appears at the output of the comparator.

30. The method of claim 28, further comprising the step of turning the LED OFF from the ON state when the second voltage appears at the output of the comparator.

31. A state of charge detector circuit for an electrochemical cell being charged with current pulses in a battery charger, the circuit comprising:
   a. means for monitoring a charge signal;
   b. means for determining a time-averaged value corresponding to an average of the monitored charge signal over a selected period of time; and c. means for detecting whether the state of charge of the cell is above a predetermined level by comparing the time-averaged value to a predetermined reference value, the detecting means providing a first output signal when the time-averaged value signal exceeds the predetermined reference value, and a second output signal when the time-averaged value is less than the predetermined reference value.

32. The circuit of claim 31, further comprising a means for latching the output of the detecting means when the second output signal appears at the output of the detecting means.

33. The circuit of claim 31, further comprising a means for disabling the provision of charging current to the cell when the second output signal appears at the output of the detecting means.

34. The circuit of claim 31, wherein the charge signal is a charge control enable signal.

35. The circuit of claim 31, wherein the charge signal is a transistor base drive signal.

36. The circuit of claim 31, wherein the monitoring means is a comparator.

37. The circuit of claim 31, wherein the monitoring means comprises a current transformer.

38. The circuit of claim 31, wherein the determining means is a low-pass filter network.

39. The circuit of claim 31, wherein the determining means is a microprocessor.

40. The circuit of claim 31, wherein the detecting means is a comparator.

41. The circuit of claim 40, wherein the comparator is a hysteretic comparator.

42. The circuit of claim 31, wherein the detecting means is a microprocessor.

43. The circuit of claim 31, further comprising a means for indicating the state of charge of the cell.

44. The circuit of claim 43, wherein the indicating means is activated when the second output signal appears at the output of the detecting means.

45. The circuit of claim 42, wherein the indicating means is deactivated when the second output signal appears at the output of the detecting means.

46. The circuit of claim 42, wherein the indicating means is an audio indicating means.

47. The circuit of claim 42, wherein the indicating means is visual indicating means.

48. The circuit of claim 42, wherein the indicating means is an LED.

49. The circuit of claim 48, wherein the indicating means is an incandescent bulb.

50. A state of charge detector circuit for an electrochemical cell being charged by current pulses, the circuit comprising:
   a. means for low-pass filtering a charge signal, the low-pass filtering means providing a filtered output signal;
   b. means for comparing a reference signal and the filtered output signal, the comparing means providing a first output signal when the voltage of the filtered signal exceeds the voltage of the reference signal, and a second output signal when the voltage of the filtered output signal is less than voltage of the reference signal.

51. The circuit of claim 50, further comprising a means for latching the output of the comparing means when the second output signal appears at the output of the comparing means.

52. The method of claim 50, further comprising a means for disabling the provision of charging current to the cell when the second output signal appears at the output of the comparing means.

53. The circuit of claim 50, wherein the charge signal is a charge control enable signal.

54. The circuit of claim 50, wherein the charge signal is a transistor base drive signal.

55. The circuit of claim 50, wherein the low-pass filtering means comprises a single-pole low-pass filter network.

56. The circuit of claim 50, wherein the low-pass filtering means comprises a multiple pole low-pass filter network.

57. The circuit of claim 50, wherein the comparing means is a comparator.

58. The circuit of claim 57, wherein the comparing means is a hysteretic comparator.

59. The circuit of claim 50, further comprising a means for indicating the state of charge of the cell.

60. The circuit of claim 59, wherein the indicating means is activated when the second output signal appears at the output of the comparing means.

61. The circuit of claim 59, wherein the indicating means is deactivated when the second output signal appears at the output of the comparing means.

62. The circuit of claim 59, wherein the indicating means is an audio indicating means.

63. The circuit of claim 59, wherein the indicating means is visual indicating means.

64. The circuit of claim 63, wherein the indicating means is an LED.

65. The circuit of claim 63, wherein the indicating means is an incandescent bulb.

66. A state of charge detector circuit for an electrochemical cell being charged by current pulses, the circuit comprising:
   a. means for determining a time-averaged value corresponding to an average of a charge signal over a selected period of time; and
   b. means for comparing the time-averaged value to a predetermined reference value, the comparing means providing a first output signal when the time-averaged value exceeds the predetermined reference value, and a second output signal when the time-averaged value is less than the predetermined reference value.

67. The circuit of claim 66, further comprising a means for latching the output of the comparing means when the second output signal appears at the output of the comparing means.

68. The circuit of claim 66, further comprising a means for disabling the provision of charging current to the cell when the second output signal appears at the output of the comparing means.

69. The circuit of claim 66, wherein the charge signal is a charge control enable signal.

70. The circuit of claim 66, wherein the charge signal is a transistor base drive signal.

71. The circuit of claim 66, wherein the determining means is a low-pass filter network.

72. The circuit of claim 66, wherein the comparing means is a comparator.

73. The circuit of claim 72, wherein the comparator is a hysteretic comparator.

74. The circuit of claim 66, wherein the determining means is a microprocessor.

75. The circuit of claim 66, wherein the comparing means is a microprocessor.

76. The circuit of claim 66, further comprising a means for indicating the state of charge of the cell.

77. The circuit of claim 76, wherein the indicating means is activated when the second output signal appears at the output of the comparing means.

78. The circuit of claim 76, wherein the indicating means is deactivated when the second output signal appears at the output of the comparing means.

79. The circuit of claim 76, wherein the indicating means is an audio indicating means.

80. The circuit of claim 76, wherein the indicating means is visual indicating means.

81. The circuit of claim 80, wherein the indicating means is an LED.

82. The circuit of claim 80, wherein the indicating means is an incandescent bulb.

83. A battery charging circuit for charging an electrochemical cell with current pulses, comprising:

a. a DC power source;

b. a system clock for providing a clock output signal of a predetermined frequency;

c. a first electronic switch having the clock signal applied to the base thereof, the first switch opening and closing at the predetermined frequency, and providing pulses of electric current from the DC power supply to the cell;

d. a second electronic switch having the clock signal applied to the base thereof, the second switch being complementary to the first switch and opening and closing at the frequency, the second switch having the Open-circuit voltage of the cell disposed thereacross when the first switch is open and the second switch is closed;

e. a charge control enable means for comparing the open-circuit voltage to a first reference voltage, the comparing means providing a first charge signal output of a first voltage when the first reference voltage exceeds the open-circuit voltage, and a second charge signal output of a second voltage when the open-circuit voltage exceeds the first reference voltage;

f. means for determining a time-averaged value corresponding to a time average of the first and second charge signal outputs;

g. means for comparing the time-averaged value to a predetermined reference value, the comparing means providing a third output signal when the time-averaged value exceeds the predetermined reference value, and a fourth output signal when the time-averaged value is less than predetermined reference value.

84. The circuit of claim 83, further comprising a means for latching the output of the comparing means when the fourth output signal appears at the output of the comparing means.

85. The circuit of claim 83, further comprising a means for disabling the provision of charging current to the cell when the fourth output signal appears at the output of the comparing means.

86. The circuit of claim 83, wherein the determining means is a low-pass filter network.

87. The circuit of claim 83, wherein the comparing means is a comparator.

88. The circuit of claim 87, wherein the comparator is a hysteretic comparator.

89. The circuit of claim 83, wherein the determining means is a microprocessor.

90. The circuit of claim 83, wherein the comparing means is a microprocessor.

91. The circuit of claim 83, further comprising a means for indicating the state of charge of the cell.

92. The circuit of claim 91, wherein the indicating means is activated when the fourth output signal appears at the output of the comparing means.

93. The circuit of claim 91, wherein the indicating means is deactivated when the fourth output signal appears at the output of the comparing means.

94. The circuit of claim 91, wherein the indicating means is an audio indicating means.

95. The circuit of claim 91, wherein the indicating means is visual indicating means.

96. The circuit of claim 95, wherein the indicating means is an LED.

97. The circuit of claim 95, wherein the indicating means is an incandescent bulb.

* * * * *

UNITED STATES PATENT AND TRADEMARK OFFICE
CERTIFICATE OF CORRECTION

PATENT NO. : 5,661,393
DATED : August 26, 1997
INVENTOR(S) : Upal Sengupta

It is certified that error appears in the above-indentified patent and that said Letters Patent is hereby corrected as shown below:

1. In column 4, lines 40-53, delete:

"FIG. 11(a) shows a modeled charge enable control signal of the battery charging system of FIG. 5 at the beginning of the charge cycle;

FIG. 11(b) shows a modeled voltage across a rechargeable alkaline manganese dioxide cell as it is charged by the battery charging system of FIG. 5 and in accordance with the charge enable control signal of FIG. 11(a);

FIG. 11(c) shows the charge enable control signal of FIG. 11(a) after it has been low-pass filtered in accordance with the present invention;

FIG. 11(d), corresponding to FIGS. 11(a) through 11(c), shows the modeled current delivered to LED indicator 129 of FIG. 5;"

and insert in its place -- FIG. 11 shows the circuit of Figure 9, also including an overcharge protection circuit.--.

UNITED STATES PATENT AND TRADEMARK OFFICE
CERTIFICATE OF CORRECTION

PATENT NO. : 5,661,393
DATED : August 26, 1997
INVENTOR(S) : Upal Sengupta

It is certified that error appears in the above-identified patent and that said Letters Patent is hereby corrected as shown below:

2. In column 9, line 24, delete "ND" and insert in its place --A/D --.

3. In column 13, line 48, delete "Whenever" and insert in its place --whenever --.

Signed and Sealed this

Twelfth Day of January, 1999

Attest:

Attesting Officer

*Acting Commissioner of Patents and Trademarks*